(12) United States Patent
Di Febbo et al.

(10) Patent No.: US 12,167,129 B2
(45) Date of Patent: Dec. 10, 2024

(54) VIDEO MONITORING USING A HIERARCHICAL COMBINATION OF CAMERA SENSORS

(71) Applicant: Apple Inc., Cupertino, CA (US)

(72) Inventors: Paolo Di Febbo, Redwood City, CA (US); Chaminda N. Vidanagamachchi, San Jose, CA (US); Yohan Rajan, Cupertino, CA (US); Anselm Grundhoefer, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/481,066

(22) Filed: Oct. 4, 2023

(65) Prior Publication Data

US 2024/0107154 A1     Mar. 28, 2024

Related U.S. Application Data

(63) Continuation of application No. 17/150,832, filed on Jan. 15, 2021, now Pat. No. 11,792,507.

(51) Int. Cl.
| | | |
|---|---|---|
| *H04N 23/65* | (2023.01) | |
| *G06V 10/10* | (2022.01) | |
| *G06V 10/147* | (2022.01) | |
| *G06V 10/22* | (2022.01) | |
| *G06V 10/82* | (2022.01) | |

(Continued)

(52) U.S. Cl.
CPC ............ *H04N 23/651* (2023.01); *G06V 10/82* (2022.01); *G06V 20/52* (2022.01); *G08B 13/19643* (2013.01); *H04N 7/188* (2013.01); *H04N 23/45* (2023.01); *H04N 23/61* (2023.01); *H04N 23/667* (2023.01); *G06V 10/147* (2022.01);

(Continued)

(58) Field of Classification Search
None
See application file for complete search history.

(56) References Cited

U.S. PATENT DOCUMENTS

| | | |
|---|---|---|
| 7,551,203 B2 | 6/2009 | Nakayama et al. |
| 9,030,583 B2 | 5/2015 | Gove et al. |

(Continued)

FOREIGN PATENT DOCUMENTS

| | | |
|---|---|---|
| JP | 2007184780 A | 7/2007 |
| KR | 20150081226 A | 7/2015 |

*Primary Examiner* — Mark T Monk
(74) *Attorney, Agent, or Firm* — Kowert, Hood, Munyon, Rankin & Goetzel, P.C.; Scott W. Pape; Dean M. Munyon

(57) ABSTRACT

An apparatus includes a primary camera sensor configured to capture images having a first resolution, a primary processing circuit configured to process images captured by the primary camera sensor, a secondary camera sensor configured to capture images having a second resolution, and a secondary processing circuit configured to process images captured by the secondary camera sensor. In response to a determination that a particular object of interest is included in a particular image, the secondary processing circuit may be further configured to cause the primary processing circuit and the primary camera sensor to exit a reduced power mode. The primary camera sensor may be further configured, in response to the exiting, to capture a different image. The primary processing circuit may also be configured to process the different image to validate the particular object of interest.

20 Claims, 10 Drawing Sheets

(51) Int. Cl.
*G06V 20/52* (2022.01)
*G06V 20/58* (2022.01)
*G08B 13/196* (2006.01)
*H04N 7/18* (2006.01)
*H04N 23/45* (2023.01)
*H04N 23/61* (2023.01)
*H04N 23/667* (2023.01)

(52) U.S. Cl.
CPC .............. *G06V 10/16* (2022.01); *G06V 10/22* (2022.01); *G06V 20/58* (2022.01)

(56) References Cited

U.S. PATENT DOCUMENTS

| | | |
|---|---|---|
| 9,438,868 B2 | 9/2016 | Boettiger |
| 10,063,757 B2 | 8/2018 | Mark et al. |
| 10,922,833 B2 | 2/2021 | Croxford et al. |
| 11,010,644 B2 | 5/2021 | Croxford et al. |
| 11,144,749 B1* | 10/2021 | Lo .................... G08B 13/19669 |
| 11,301,705 B2 | 4/2022 | Wu et al. |
| 11,301,728 B2 | 4/2022 | Croxford |
| 2006/0012681 A1 | 1/2006 | Fujii |
| 2014/0218587 A1 | 8/2014 | Shah |
| 2017/0316284 A1 | 11/2017 | Chang et al. |
| 2017/0353699 A1* | 12/2017 | Wang ............... G08B 13/19695 |
| 2019/0385024 A1* | 12/2019 | Croxford ................. G06N 3/08 |
| 2020/0342285 A1 | 10/2020 | Croxford et al. |
| 2020/0342291 A1 | 10/2020 | Croxford et al. |
| 2021/0073945 A1 | 3/2021 | Kim et al. |

\* cited by examiner

Example 1

Example 2 t1:

image 333a t3:

image 334a (a) (c)
bounding box 350
(b) (d)

t2:

image 333b t4:

image 334b

VIDEO MONITORING USING A HIERARCHICAL COMBINATION OF CAMERA SENSORS

The present application is a continuation of U.S. application Ser. No. 17/150,832, entitled "Video Monitoring Using a Hierarchical Combination of Camera Sensors," filed Jan. 15, 2021, the disclosure of which is incorporated by reference herein in its entirety.

BACKGROUND

Technical Field

Embodiments described herein are related to video monitoring and, more particularly, to use of multiple camera sensors to monitor a visible area.

Description of the Related Art

Camera sensors may be used to generate images of a visible area. These images may then be analyzed by processing circuits to identify particular portions of the image (e.g., facial recognition) or to identify particular movements (e.g., gesture recognition). Images used for such identifications may have high resolutions to obtain visual details necessary to achieve a desired accuracy. Furthermore, techniques used for these identification analyses may utilize processing circuits capable of analyzing multiple characteristics that may be present in the high-resolution images. Power requirements for capturing and processing high resolution images result in many such systems being static and powered by an AC power line or other non-mobile power source.

SUMMARY

In an embodiment, an apparatus includes a primary camera sensor configured to capture images having a first resolution, a primary processing circuit coupled to the primary camera sensor and configured to process images captured by the primary camera sensor, a secondary camera sensor configured to capture images having a second resolution that is lower than the first resolution, and a secondary processing circuit coupled to the secondary camera sensor and configured to process images captured by the secondary camera sensor. The secondary processing circuit may be further configured, in response to a determination that a particular object of interest is included in a particular image, to cause the primary processing circuit and the primary camera sensor to exit a reduced power mode. The primary camera sensor may be further configured, in response to the exiting, to capture a different image. The primary processing circuit may be further configured to process the different image to validate the particular object of interest.

In a further embodiment, the secondary processing circuit and the secondary camera sensor may receive power from an always-on power node. In another example, the apparatus may further include an optical lens system. The primary camera sensor and the secondary camera sensor may be coupled to the optical lens system.

In one example, the primary processing circuit may be further configured to determine that no objects to of interest are included in a given image from the primary camera sensor, and to cause, in response to the determination, the primary camera sensor enter the reduced power mode. In response to the primary camera sensor entering the reduced power mode, the primary processing circuit may enter the reduced power mode.

In an example, the secondary processing circuit may be further configured, in response to the primary processing circuit exiting the reduced power mode, to send information associated with the particular image to the primary processing circuit. In a further embodiment, the sent information may include one or more sets of co-ordinates associated with the particular object of interest. In another example, the sent information may include a priority level associated with the particular object of interest.

In another example, the primary and secondary processing circuits may include respective first and second neural networks. The second neural network may include fewer nodes than the first neural network. In one example, to determine that the particular object of interest is included in the particular image, the secondary processing circuit may be configured to compare the particular image to at least one previously captured image.

BRIEF DESCRIPTION OF THE DRAWINGS

The following detailed description makes reference to the accompanying drawings, which are now briefly described.

Figure 1:
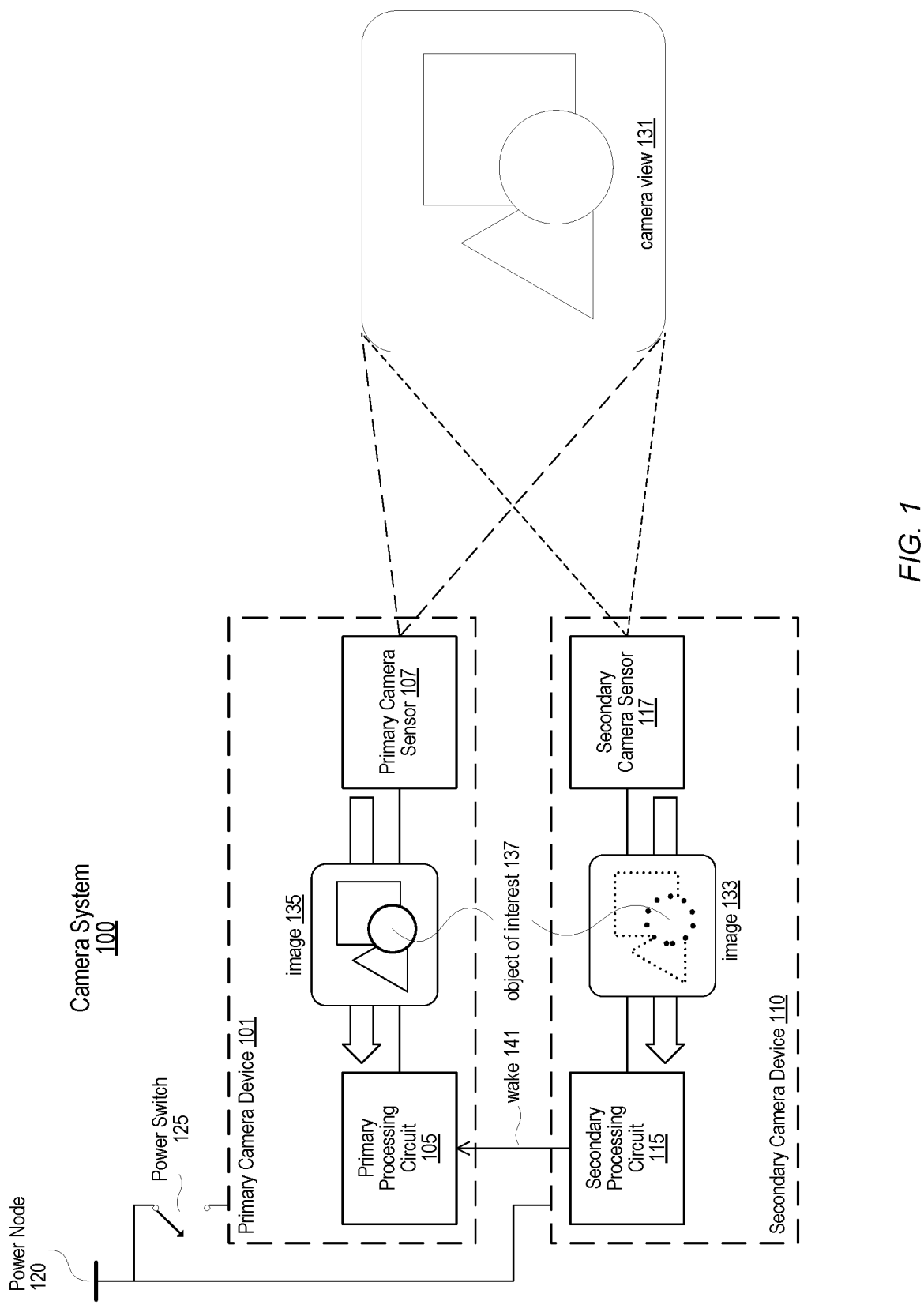
FIG. 1 illustrates a block diagram of an embodiment of a camera system with two camera sensors.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, a camera system may be used to identify objects and/or movements that are in a field of view of the camera system. Such a system, however, may consume an amount of power that limits portability of the camera system due to bulk of a power source, or limits a number of times that the camera system can perform the identifications due to a limited power supply.

A computing device is desired that can perform object identifications frequently, e.g. multiple times per minute over a day of constant or frequent use. For example, a wearable camera system could be used to monitor a user's surroundings and detect when a person, an item, a place, or other object of interest comes into view of the wearable camera system. Such a wearable camera system may be included in a smart watch, a pendant, a headband/hat, eyeglasses, or another apparatus worn fully or partially on the body of a user. A wearable camera system for such applications, however, may have a limited power supply for performing object identification tasks, particularly if the camera system is included in a device that performs other, unrelated tasks.

The present disclosure recognizes that a camera system that utilizes a low-power low-resolution image capturing and processing system in combination with higher-resolution image capturing and processing system may be capable of performing object identification tasks while consuming an acceptable amount power from a portable power supply. In such a hierarchical camera system, a low-resolution image may be captured periodically, e.g., every second, and analyzed using a low power processing circuit. Such analysis may generate a coarse determination of whether an object of interest has entered a view of a camera lens. If an object of interest is suspected, then the higher-resolution image capturing and processing system captures a higher-resolution image and determines whether the coarse determination was valid. In response to a valid determination, a user of the camera system is alerted to the object in question. Use of the low-resolution image capturing and processing system to provide an initial indication of an object of interest may reduce overall power consumption in comparison to using a single higher-resolution image capturing and processing system, in an embodiment. Such a hierarchical camera system may be capable of operating over a course of a user's day using a portable power source, such as a battery capable of fitting into a watch or eyeglasses, in an embodiment. While specific examples of time intervals and time of use intervals are given herein, it is noted that longer or shorter intervals may be used in various embodiments and various embodiments may support different amounts of time of use based on a given power supply.

Embodiments of apparatus and methods are presented in which a secondary camera sensor is configured to capture images using a low resolution, and a secondary processing circuit is configured to process images captured by the secondary camera sensor. In response to a determination that an object of interest is included in a particular image, the secondary processing circuit causes a primary processing circuit and a primary camera sensor to exit a reduced power mode. The primary camera sensor is configured to capture a different image having a higher resolution than the particular image. The primary processing circuit is further configured to process the different image to validate the particular object of interest.

FIG. 1 illustrates a block diagram of one embodiment of a camera system utilizing two camera sensors. In the illustrated embodiment, camera system 100 includes primary camera device 101 and secondary camera device 110. Primary and secondary camera devices 101 and 110 include respective processing circuits (105 and 115) and respective camera sensors (107 and 117). Both primary and secondary camera devices 101 and 110 receive power via power node 120, although primary camera device 101 receives the power through power switch 125. In some embodiments, circuitry associated with camera system 100 is included in an integrated circuit (IC), such as a system-on-chip (SoC) which, in turn, may include one or more other processing circuits. In other embodiments, the circuitry associated with camera system 100 may be implemented using any suitable combination of multiple integrated circuits (ICs). For example, circuitry associated for primary camera device 101 may be implemented on a first IC, and circuitry associated with secondary camera device 110 may be implemented on a second IC, or circuitry for primary and secondary processing circuits 105 and 115 may be implemented on a first IC while circuitry for primary and secondary camera sensors 107 and 117 is implemented on a second IC. In some embodiments, primary and secondary processing circuits 105 and 115, and primary and secondary camera sensors 107 and 117 may each be implemented on respective ICs.

Camera system 100 may be included in a computing device, such as a wearable smart-device (smartwatch, smart-glasses, etc.) or a smartphone or camera affixed to a wearable item such as a hat or lanyard. In some embodiments, computing device may be a stationary device such as a security camera at a residence, office, or the like. In various embodiments, the computing device may include a display and/or audio speaker, and/or may be coupled to another device that includes such elements. Camera system 100 is configured to perform monitoring tasks of an area near the wearer/user. Camera system 100, may, for example, be used as part of a navigation application to guide the user to a particular location, or to provide information to the user regarding points of interest, businesses, schools, government offices, and the like. Additionally, camera system 100 may be used to provide information regarding safety and security of the user, e.g., identify a rapidly approaching vehicle, identify dangerous animals, poisonous plants, and other such threats. In regards to stationary devices, one or more camera systems may be placed around a structure to provide information such as identifying people walking into and out of monitored areas, track and identify pets and/or wildlife traversing through the field of view, and the like. Parks and wildlife refuges may use camera system to monitor endangered species and identify threats (e.g., poachers, predators, floods, fire, etc.) that may harm the species. Numerous monitoring uses for camera system 100 are contemplated.

To perform such monitoring functions, camera system 100 may remain in, or frequently enter, an active mode in which an image is generated and processed to identify if an object of interest is in view of the camera. Such constant or frequent usage, however, may require a considerable amount of power, particularly if camera system 100 is expected to be operating for a long period of time, such as a waking part of the user's day. In order to satisfy power consumption targets to meet operational expectations, camera system 100 includes two camera devices, primary camera device 101 and secondary camera device 110.

As shown, primary camera device 101 includes primary camera sensor 107 configured to capture images having a first resolution, and primary processing circuit 105 that is coupled to primary camera sensor 107 and is configured to process images captured by the primary camera sensor 107. Primary camera sensor 107 is capable of capturing images at a resolution that is high enough to perform the monitoring functions described above. Furthermore, primary processing circuit 105 is capable of processing the images captured by primary camera sensor 107 to identify objects of interest that camera system 100 is configured to identify. For example, camera system 100 may be configured to identify particular articles of clothing belonging to the user. Accordingly, in this example, primary camera sensor 107 and primary processing circuit 105 are capable of distinguishing between images of articles of clothing belonging to the user from images of other similar, but distinct articles of clothing. In an embodiment, camera system 100 may also identify any article of clothing as an "object of interest" that may warrant further processing/identification. In addition, primary camera sensor 107 and primary processing circuit 105 may be capable of distinguishing between an image captured of an image of a known article of clothing from an image of the actual known article of clothing.

To provide these capabilities, primary camera device 101 may consume an amount of power that would, if used exclusively for monitoring tasks, drain a battery included in the computing device in an unacceptably short amount of time, for example one hour. To extend battery life, primary camera device 101 is coupled to power node 120 via power switch 125. To reduce power consumption, camera system 100 may place primary camera device into a reduced power mode when primary camera device 101 is not active by opening power switch 125 to prevent current from reaching one or more circuits included in primary camera device 101. In some embodiments, power switch 125 may be implemented using one or more metal-oxide-semiconductor field-effect transistors (MOSFETs) or other type of transconductance devices. Although illustrated as switching power on or off to an entirety of primary camera device 101, power switch 125 may, in other embodiments, control power delivery to a subset of circuits of primary camera device 101. Generally, a "reduced power mode" is a mode in which the power consumed is less than the power consumed in another power mode to which it is compared.

Camera system 100 further includes secondary camera device 110. Secondary camera device 110, as illustrated, includes secondary camera sensor 117 that is configured to capture images having a second resolution that is lower than the first resolution of primary camera sensor 107. In addition, secondary camera device 110 includes secondary processing circuit 115 that is coupled to secondary camera sensor 117 and is configured to process images captured by the secondary camera sensor. Secondary camera device 110 is, as shown, coupled directly to power node 120, and may therefore, be active whenever power node 120 is providing power. In some embodiments, power node 120 may be an always-on power node, providing power to secondary camera device 110 whenever the computing device is powered-on.

To prevent an unacceptable amount of battery drain, secondary camera device 110, as shown, is designed for a particular amount of power consumption while active. This limited amount of power may result in more limited image processing capabilities than are available in primary camera device 101. Accordingly, in some embodiments, secondary camera sensor 117 captures images with reduced resolution as compared to primary camera sensor 107. In some embodiments, secondary camera sensor 117 captures images with the same resolution as compared to primary camera sensor 107, but may employ one or more image processing techniques to reduce power consumption. The reduced resolution may result in secondary camera sensor 117 consuming less power than primary camera sensor 107. In a similar manner, secondary processing circuit 115 may have reduced processing capabilities as compared to primary processing circuit 105. Secondary camera device 110, therefore, may not perform identification tasks with a same level of accuracy as primary camera device 101.

While camera system 100 is enabled for monitoring tasks, secondary camera device 110, as depicted, remains active while primary camera device 101 is in the reduced power mode. While primary camera device 101 is in the reduced power mode, secondary camera sensor 117 captures image 133. Secondary processing circuit 115 analyzes image 133 to detect whether an object of interest may be included in image 133. Secondary processing circuit 115 may be configured to detect objects with a particular shape, size, type of movement, and or color. For example, secondary processing circuit 115 may attempt to detect any one or more of: people, particular types of animals, particular objects in a room, business signs, road signs, vehicular traffic, and the like. The detection may be location-aware (e.g. attempting to detect different objects when indoors versus outside, or according to a particular location such as home or work). Due to the lower resolution of image 133 and to reduced processing capabilities in comparison to primary camera device 101, secondary processing circuit 115 may not be capable of identifying a specific person, place, or thing, but instead detect objects that might be of importance or interest to the user.

In some embodiments, the user of the computing device may provide information to camera system 100 indicative of particular interests the user wants camera system 100 to identify. In other embodiments, particular interests may be determined based on information included in the computing device or other devices with which the computing device may communicate. For example, if the computing device that includes camera system 100 is a pair of smart eyeglasses, then the eyeglasses may communicate with a remote computing device such as a smart phone or tablet that a wearer of the eyeglasses has nearby. The camera system 100 may communicate with the smart phone to identify images of contacts, pets, or other objects. If the user has a substantial number of photos of birds in a photo gallery, then camera system 100 may determine that the user is a bird watcher and monitor captured images for birds. In some embodiments, camera system 100 may use the smart phone to access social media of the user to identify interests. Camera system 100 may access a map, navigation, and/or a calendar application on the smart phone to determine if the user is in route to a particular location or is searching for a particular type of business such as a restaurant, museum, shopping, and the like. Such access to personal information by camera system 100 may be limited by the user, for example, via a set of privacy settings, to prevent camera system 100 from accessing more information that the user is comfortable sharing.

In response to a determination that object of interest 137 is included in image 133, secondary processing circuit 115 is configured to cause primary processing circuit 105 and primary camera sensor 107 to exit the reduced power mode. As shown, secondary processing circuit 115 may identify a particular shape within image 133 as object of interest 137. Secondary processing circuit 115 may not have a capability to definitively decide that object of interest 137 is a valid object of interest to the user, but instead recognizes enough details to determine that the detected object may be of interest. Secondary processing circuit 115 asserts an indication of a detection of object of interest 137 (e.g., wake signal 141) which causes primary camera device 101, including both primary processing circuit 105 and primary camera sensor 107 to exit the reduced power mode and enter an active mode.

As depicted, primary camera sensor 107 is further configured, in response to the exiting, to capture a different image 135. Image 135, due to being captured by primary camera sensor 107, has a higher resolution than image 133. In turn, primary processing circuit 105 is further configured to process image 135 to validate object of interest 137. Primary processing circuit 105, in some embodiments, includes more processing bandwidth and/or processing performance than secondary processing circuit 115, enabling primary processing circuit 105 to analyze the higher resolution image 135 and identify, with greater accuracy than secondary processing circuit 115, if object of interest 137 satisfies a threshold level of interest for notifying the user.

In response to determining that the particular object is an object of interest, primary processing circuit 105, as shown, causes a notification to be sent to a display coupled to the primary camera device. In various embodiments, the display (not shown in FIG. 1) may be included in a same computing device as camera system 100, or may be included in a separate device that is communicatively coupled to the computing device including camera system 100. For example, the computing device may be a smart watch or smart glasses that include an integrated screen for displaying content to the user. In other embodiments, the computing device may be another form of wearable device such as a hat or pendant that uses a wired or wireless communication link to a smartphone, tablet, or the like. In other embodiments, the notification may be audible, utilize vibrations, or include various combinations of visual, audible, and vibrations.

In response to a determination that no objects to of interest are included in image 135 from primary camera sensor 107, primary processing circuit 105, as depicted, causes primary camera sensor 107 to enter the reduced power mode. Furthermore, in response to primary camera sensor 107 entering the reduced power mode, primary processing circuit 105 enters the reduced power mode. As illustrated, primary processing circuit 105 determines that the indication of the detection of object of interest 137 received from secondary processing circuit 115 was invalid. Primary camera device 101 returns to the reduced power mode without generating any notification to the user. In an embodiment, the primary camera device 101 may be configured to attempt to identify object(s) of interest for multiple consecutive image captures when the primary camera device 101 has been powered up from the reduced power mode, to provide an amount of hysteresis before returning to the reduced power mode. For example, for some reason the initial image captured may not include the object that was identified by the secondary camera device 110, but a subsequent image may include the object.

In some embodiments, primary processing circuit 105 may log or otherwise save information associated with a confirmation or invalidation of an object of interest identified by secondary processing circuit 115. Such a log may be used to train secondary processing circuit 115 to increase accuracy of future determinations regarding objects of interests. Such a log may also be used to prevent the secondary processing circuit 115 from immediately recognizing the same potential object and causing the camera system 100 to exit the reduced power mode. That is, the log may be used as a filter to temporarily prevent previously identified objects of potential interest from being identified again for a period of time after it is invalidated as an object of interest.

By utilizing a secondary camera device in combination with a primary camera device, an image monitoring system may be capable of running constantly or periodically over a longer period of time than if only a primary camera device were used. Use of the secondary camera device may allow the primary camera device to remain in a reduced power mode for periods of time while the secondary camera device monitors images to perform an initial, coarse-grained determination of whether or not an object of interest has entered a field of view of a camera. A lower power consumption of the secondary camera device in comparison to the primary camera system may reduce overall power consumption of a camera system that is used to provide constant or frequent monitoring of a field of view.

It is noted that camera system 100, as illustrated in FIG. 1, is merely an example. The illustration of FIG. 1 has been simplified to highlight features relevant to this disclosure. Various embodiments may include different configurations of the circuit elements. For example, primary camera device 101 is shown receiving power from a single power switch 125. In other embodiments, additional power switches may be included and/or primary camera device 101 may utilize other techniques for reducing power consumption in the reduced power mode. Although only two camera devices are shown, it is contemplated that additional camera systems of varying capabilities and power consumption may be utilized in other embodiments.

The processor illustrated in FIG. 1 includes two camera sensors sharing a same field of view. Sharing a same field of view may be implemented using a variety of techniques. One such techniques for sharing a same field of view between two sensors is shown in FIG. 2.

Figure 2:
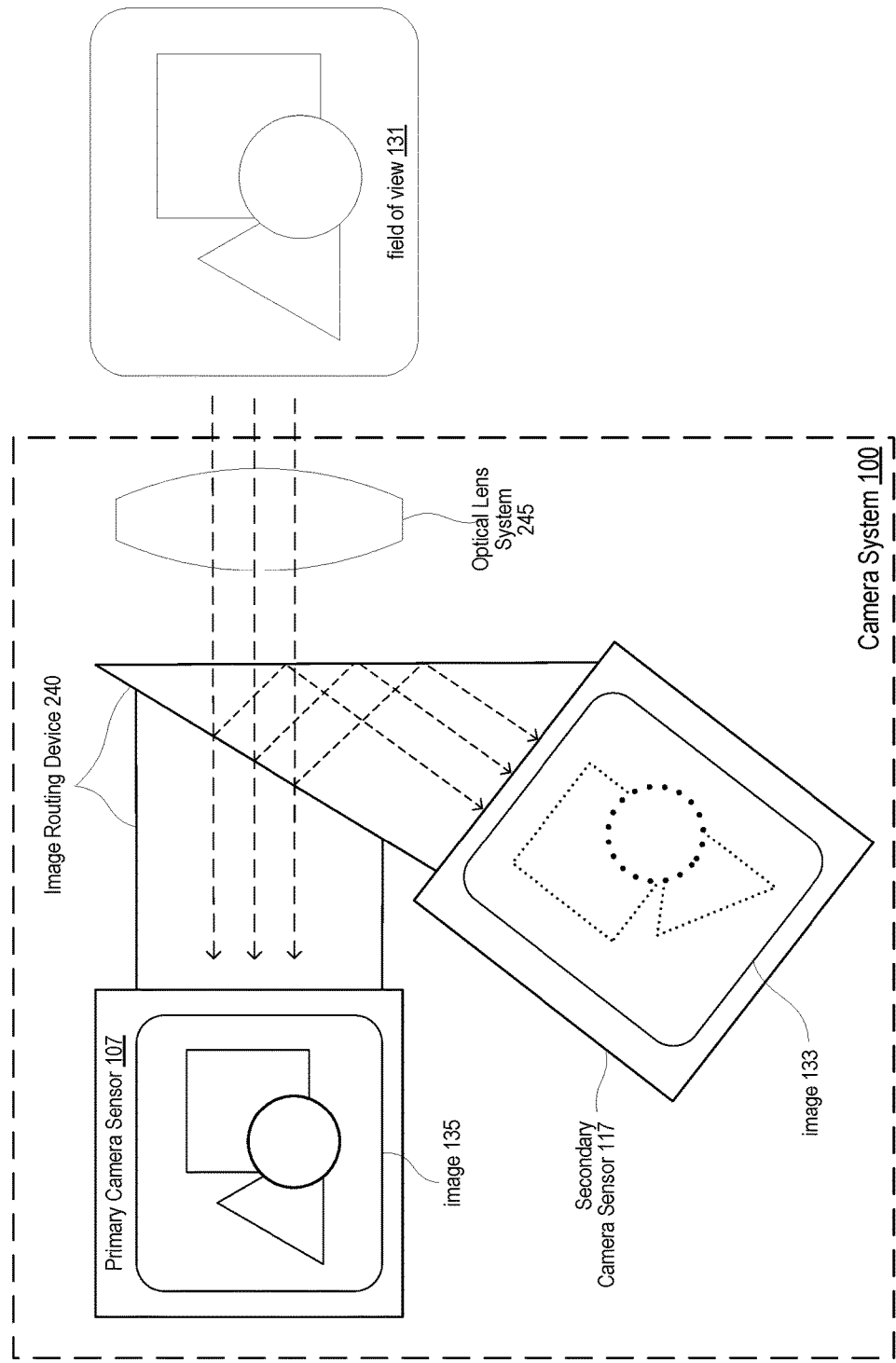
FIG. 2 shows a block diagram of an embodiment of an image routing device used to present a camera lens view to two camera sensors.

Moving to FIG. 2, a diagram of an embodiment of two camera sensors sharing a lens is shown. As illustrated, camera system includes primary camera sensor 107 and secondary camera sensor 117 as described above in regards to FIG. 1. Camera system 100 further includes optical lens system 245, wherein primary camera sensor 107 and secondary camera sensor 117 are coupled to optical lens system 245 via image routing device 240. Image routing device 240 is configured to present field of view 131 via optical lens system 245 to both camera sensors.

As illustrated, primary camera sensor 107 and secondary camera sensor 117 are configured to capture images 135 and 133, respectively, from optical lens system 245. Secondary camera sensor 117 is configured to capture images with a lower resolution than the images captured by primary camera sensor 107. Optical lens system 245 is illustrated as a single lens, but may include any suitable number of lenses configured to capture and focus on a particular area of view. In various embodiments, optical lens system 245 may be a fixed focus or variable focus lens, and may made from any suitable glass, plastic, polycarbonate, or other transparent material, or a combination thereof.

As shown, image routing device 240 is coupled to optical lens system 245 and is configured to present respective images 135 and 133 to primary camera sensor 107 and secondary camera sensor 117. Image routing device 240 is illustrated as a prism, including a combination of a triangle-shaped and a trapezoid-shaped transparent elements, although, in other embodiments, the shapes and/or number of elements may differ. Image routing device 240 is configured to present a same field of view 131 to primary camera sensor 107 and secondary camera sensor 117. Primary camera sensor 107 and secondary camera sensor 117 may, therefore, be capable of capturing respective images 135 and 133 of field of view 131 that are geometrically aligned and registered with respect to each other. For example, as illustrated, the various objects within images 133 and 135 have a same scale and position within the bounds of the two images.

In some embodiments of a computing device that includes camera system 100, space may be limited, and therefore, use of image routing device 240 to share field of view 131 via optical lens system 245 may be implemented to reduce a size as compared to having independent lens systems for each camera sensor. In some embodiments, including dedicated lens systems for each camera sensor may be more costly than using image routing device 240 to share optical lens system 245. Additionally, by sharing optical lens system 245 with primary and secondary camera sensors 107 and 117, differences between images 133 and 135 due to different lens locations, magnifications, focal points, and such may be eliminated. An increase in image similarities may allow for a more direct comparison of images 133 and 135 and avoid a preprocessing step to make the two images compatible.

It is noted that, although a prism is used to illustrate image routing device 240, other optical techniques may be utilized in place of a prism. For example, a matte screen may be used, on which an image of field of view 131 is projected. Primary and secondary camera sensors 107 and 117 may be positioned to capture images projected on the matte screen. In other embodiments, fiber optics may be utilized to direct images of field of view 131 to each of primary and secondary camera sensors 107 and 117. Some embodiments, for example, may utilize a periscopic lens system with a beam splitter to route field of view 131 to both of primary and secondary camera sensors 107 and 117. Any such technique, or a combination thereof, is contemplated for use with the disclosed embodiments.

It is also noted that the embodiment of FIG. 2 is one example. In other embodiments, a different combination of elements may be included. For example, more than two camera sensors may be included. Image routing device 240 and/or optical lens system 245 may include more and/or different elements. Although FIG. 2 depicts use of a single lens shared by the two camera sensors, in other embodiments, two or more lenses may be utilized, including respective sets of one or more lenses coupled to each camera sensor.

Figure 3:
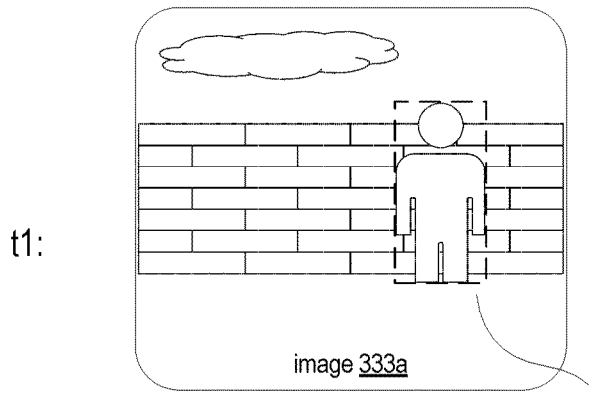
FIG. 3 depicts two examples of identifying objects within captured images.
Figure 3:
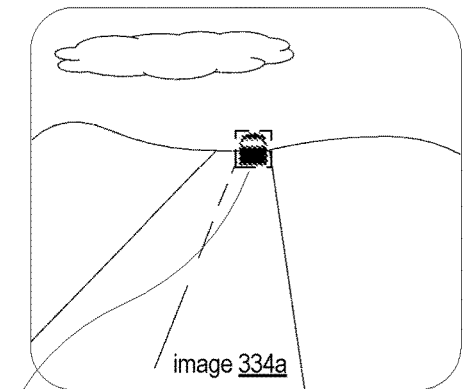
Figure 3:
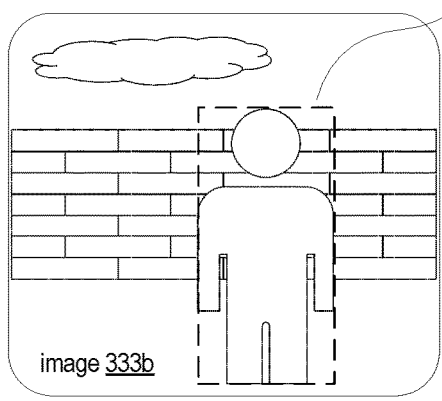
Figure 3:
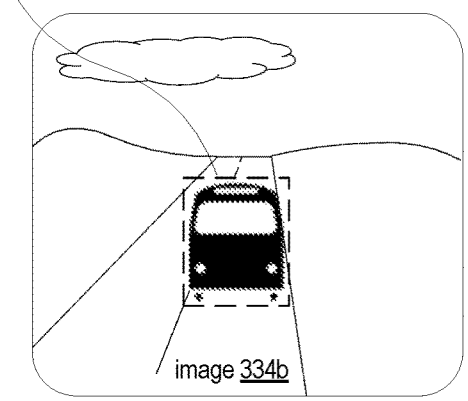

In the description of FIG. 1, camera system 100 is described as being used to identify an object(s) of interest with in a captured image. Furthermore, secondary camera device 110 is described as sending information to primary camera device 101. FIG. 3 illustrates examples of how objects of interest may be identified and what types of information may be sent from secondary camera device 110 to primary camera device 101.

Turning to FIG. 3, two examples of sets of captured images are shown. In the examples, a user of a computing device that includes camera system 100 has camera system 100 enabled to monitor the user's surroundings. Images 333*a* and 334*a* depict respective images captured by secondary camera device 110 of camera system 100 at respective first points in time (t1 and t3). Images 333*b* and 334*b* depict the same fields of view at second points in time (t2 and t4), respectively.

Referring to example 1, secondary camera sensor 117 captures, at time t1, image 333*a* that includes a view, from the user's perspective, of a person standing near a wall. Secondary processing circuit 115 analyzes image 333*a* and identifies the person in the image as a potential object of interest. Secondary processing circuit 115 creates a bounding box 350*a* that surrounds the identified object in a rectangle. Bounding box 350*a* may not be added to image 333*a*, but rather captured as coordinates or a range or ranges of pixels in image 333*a* that include the identified object, in this example, a person. Although a rectangle is used in the examples of FIG. 3, any suitable shape may be utilized.

In various embodiments, secondary processing circuit 115 may or may not determine that the object in bounding box 350*a* is an object of interest. To make such a determination, secondary processing circuit 115 may analyze one or more characteristics of the object. If a number of characteristics of the object satisfy a particular set of conditions, then secondary processing circuit 115 may determine that the object of bounding box 350*a* is an object of interest and assert wake signal 141 to cause primary camera device 101 to exit a reduced power mode and perform a subsequent analysis to validate the determination of secondary processing circuit 115.

Primary camera sensor 107 captures an image similar to image 333*a*, but with higher resolution, and provides the image to primary processing circuit 105. Secondary processing circuit 115 is configured, in response to primary processing circuit 105 exiting the reduced power mode, to send information associated with image 333*a* to primary processing circuit 105. The sent information may include, for example, one or more sets of co-ordinates associated with the particular object of interest, such as coordinates of the corners of bounding box 350*a*. The coordinates of bounding box 350*a* may help primary processing circuit 105 to quickly identify the location of the person in the higher resolution image from primary camera sensor 107, thereby reducing an amount of time for primary processing circuit 105 to perform a validation of the person identified as an object of interest by secondary processing circuit 115.

Returning to the analysis of image 333*a* by secondary processing circuit 115, if the number of analyzed characteristics is not satisfactory for determining the person is an object of interest, then secondary processing circuit 115, as shown, proceeds to analyze image 333*b*, captured by secondary camera sensor 117 at time t2. In image 333*b*, the person identified in image 333*a* has moved closer to the user. A new bounding box 350*b* is generated to identify an area of image 333*b* that includes the object of interest (e.g., the approaching person). Secondary processing circuit 115 again analyzes one or more characteristics of the person to determine if the person is an object of interest. Furthermore, to determine that the person is an object of interest included in image 333*b*, secondary processing circuit 115 is configured to compare image 333*b* to at least one previously captured image such as image 333*a*. Both similarities (e.g., characteristics of the person such as clothes and hair color, the stationary position of the wall, etc.) and differences (e.g., the position of the person relative to the wall and the user) may be used to determine if the person is an object of interest. In example 1, secondary processing circuit 115 may determine, based on analysis of images 333*a* and 333*b* (and in some embodiments, additional images) that the person approaching the user constitutes an object of interest.

In response to the identifying the approaching person as an object of interest, secondary processing circuit 115 asserts wake signal 141 to cause primary camera device 101 to exit the reduced power mode and validate the object of interest, as described above. Again, secondary processing circuit 115 may send information regarding image 333*b*, including coordinates of bounding box 350*b*, to primary processing circuit 105. Secondary processing circuit 115 may further send additional information, such as coordinates of bounding box 350*a* as well as time stamps indicating when images 333*a* and 333*b* were captured, focal settings used by secondary camera sensor 117, color ranges detected within bounding box 350*a*, initial determination results, and the like. Such information may, as well as reducing a time for primary processing circuit 105 to identify the person in a new image, enable primary processing circuit 105 to determine a rate at which the person is approaching the user, a path that the person is taking, and other such information. Primary processing circuit 105 may use these additional details to determine that the person is merely crossing a road at a crosswalk that the user is standing near, and therefore may not be of interest to the user. Alternatively, primary processing circuit 105 may use the additional details to determine that the person is walking directly towards the user and is therefore of interest to the user.

Referring to example 2, two images of a road are illustrated. A vehicle is shown approaching between image 334a and 334b. While analyzing image 334a captured at time t1, secondary processing circuit 115 generates bounding box 350c around the vehicle shown in the distance. Secondary processing circuit may determine that the vehicle is not of interest to the user based on a lack of details of the vehicle, a distance of the vehicle, and/or other characteristics. At time t2, image 334b is captured and then processed by secondary processing circuit 115. Bounding box 350d is generated by secondary processing circuit 115 around the vehicle in image 334b. Based on the relative sizes of bounding boxes 350a and 350b, secondary processing circuit 115 may determine that the vehicle heading towards the user. In addition, based on additional details of the vehicle being visible in image 334b versus 334a, secondary processing circuit 115 may be able to distinguish that the vehicle is a bus. Based on other information available to secondary processing circuit 115, a determination may be made that the user is waiting at a bus stop. For example, the computing device that includes camera system 100 or a different device coupled to the computing device may have access to a bus schedule, calendar entry, or other information that the user is planning on taking a bus. Secondary processing circuit 115 may use such data to determine that the approaching vehicle may be a bus and therefore may be of interest to the user.

In response to this determination, secondary processing circuit 115, as shown, asserts wake signal 141 to cause primary camera device 101 to exit the reduced power mode and validate if the approaching vehicle is a particular bus (e.g., by detecting a bus number or other identifying markings on the vehicle) on which the user is waiting. After primary processing circuit 105 exits the reduced power mode, secondary processing circuit sends information regarding the detected vehicle to primary processing circuit 105. This information may include, for example, coordinates of bounding box 350a and/or 350b, any relevant bus or travel information secondary processing circuit 115 has used to make the determination that the approaching vehicle is of interest to the user, and the like. In some embodiments, the sent information may include a priority level associated with the particular object of interest. For example, if an available bus schedule determines that the desired bus is not due at the current stop for some amount of time (e.g., 10 or more minutes) but a different bus is due, then the priority level may be low. In contrast, if the desired bus is due imminently, then the priority level may be high. Secondary processing circuit 115 may utilize any suitable technique for conveying a level of priority, such as a high, medium, or low ranking, a numeric scale from, e.g., 0 to 100, a single bit indicating a priority or not, and the like.

In various embodiments, the priority may be based on any suitable measure of urgency. For example, priority may be based on a user's schedule, a user's interest, a level of danger to the user, or any of various combinations thereof. For example, in examples 1 and 2, a priority may be based on a threat level to the user. If secondary processing circuit 115 identifies a potential weapon in the person's hand or determines that the approaching vehicle is heading straight for the user, then secondary processing circuit may send an indication of a highest priority to primary processing circuit 105. In some embodiments, the priority level may be incorporated into wake signal 141 and used to reduce an amount of time for primary camera device to wake from the reduced power mode, capture a new image, and begin processing. Primary camera device 101 may have multiple modes for waking from the reduced power mode based on the priority. Faster wake times may result in greater power consumption, and therefore may only be used in cases of a high priority level.

It is noted that the examples of FIG. 3 are merely for demonstrating disclosed concepts. The monitoring techniques described herein may be used for a wide variety of situations other than described in these examples. For example, the monitoring techniques may be used to identify birds for a user that has an interest in bird watching, or used to identify museums and art galleries to a user with an interest in art.

Figure 4:
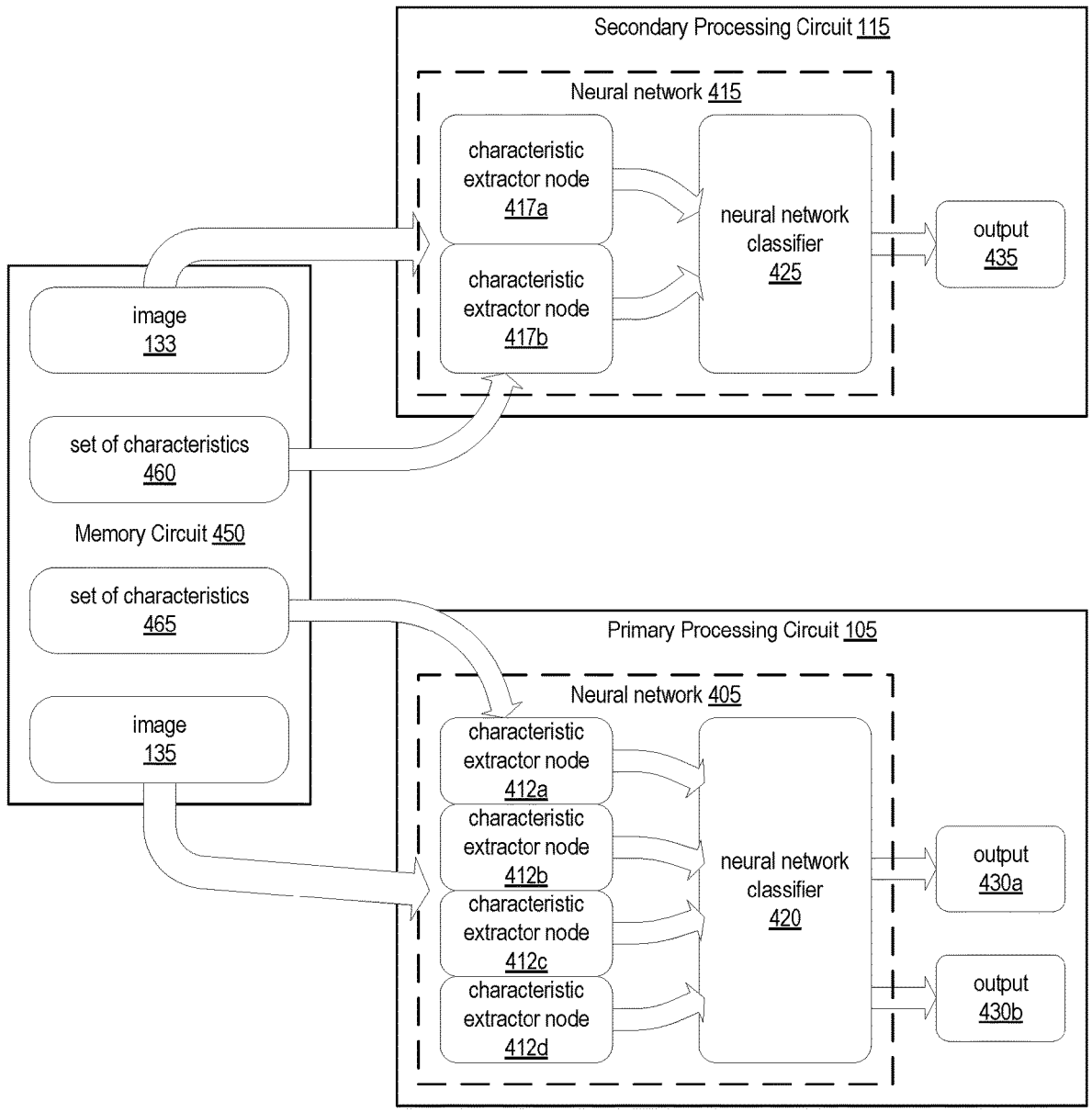
FIG. 4 illustrates a block diagram of embodiments of two image processing circuits.

In FIG. 1, a primary and secondary processing circuits are described for analyzing images and determining if objects of interest are included in the images. Various designs for implementing such processing circuits are contemplated. FIG. 4 illustrates an example design for each of a primary and secondary processing circuit Proceeding to FIG. 4, a block diagram of a camera system that includes a primary and a secondary processing circuit is shown. Secondary processing circuit 115 includes neural network 415, which further includes characteristic extractor nodes 417a and 417b, as well as neural network classifier 425. Neural network 415 generates output 435. Primary processing circuit 105 includes neural network 405, which in turn includes characteristic extractor nodes 412a-412d, as well as neural network classifier 420. Neural network 405 generates and outputs 430a and 430b. In addition to primary processing circuit 105 and secondary processing circuit 115, camera system 100 includes memory circuit 450, used to store images captured by primary and secondary camera sensors 107 and 117, respectively. Memory circuit 450 may also be used to store respective sets of characteristics 460 and 465. In some embodiments, memory circuit 450 may physically be external to camera system 100 and coupled by a memory interface, a system bus, and/or a wireless interface.

As shown in FIG. 1, primary processing circuit 105 is coupled to primary camera sensor 107, and is configured to process images captured by primary camera sensor 107. As previously described, primary processing circuit 105 is also configured to place primary camera sensor 107 and primary processing circuit 105 into a reduced power mode when not in use.

Also as shown in FIG. 1, secondary processing circuit 115 is coupled to secondary camera sensor 117, and is configured to identify a particular object included in image 133 captured by secondary camera sensor 117 and stored in memory circuit 450. In response to the identification, secondary processing circuit 115 is configured to cause primary processing circuit 105 and primary camera sensor 107 to exit the reduced power mode. In response to exiting the reduced power mode, primary processing circuit 105 is further configured to, identify the particular object in image 135 captured by primary camera sensor 107 and stored in memory circuit 450. Primary processing circuit 105 is further configured to determine whether the particular object is an object of interest to a user of a computing device that includes camera system 100.

As illustrated, to identify the particular object, primary and secondary processing circuits 105 and 115 include respective neural networks 405 and 415. Neural network 415 is configured to identify one or more characteristics of the particular object based on a first set of characteristics 460. Neural network 415 includes characteristic extractor nodes 417a and 417b to identify particular ones of set of characteristics 460 that are apparent in image 133. Each of characteristic extractor nodes 417a and 417b compare characteristics of objects that are identifiable in image 133 to one or more characteristics included in set of characteristics 460. Each of characteristic extractor nodes 417a and 417b then generates a respective output value that is indicative of whether an identifiable object in image 133 includes the one or more characteristics.

Set of characteristics 460 and 465, as shown, include one or more characteristics of various types objects that may be identified in a given image. For example, one type of object to be identified may be people. Set of characteristics 460 may include several descriptors usable by neural network 415 to identify a shape of a person in an image. Set of characteristics 460 may further include additional descriptors to identify particular features of people. Set of characteristics 465, used by neural network 405, may include additional characteristics for identifying specific people, such as co-workers, friends, family, acquaintances, and the like.

Accordingly, set of characteristics 460, as shown, provides a coarser level of details than set of characteristics 465. This difference in the level of details may enable neural network 415 to perform a faster, yet less accurate, identification of an object as compared to neural network 405. For example, neural network 415 may be capable of making a quick determination that a vehicle is rapidly approaching the user, but may not be capable of determining what type of vehicle is approaching. Neural network 405, on the other hand, may be capable of determining that the vehicle is an expected car summoned via a ride-sharing application.

It is noted that protection of personal information is desired, and in some cases, is a legal requirement. Personal identifying characteristics or other information associated with the user or people captured in images by camera system 100 may be deleted after use to comply with legal and ethical standards of privacy. For example, the user may use a ridesharing application to arrange transportation to a particular location. To help the user identify the transportation when it arrives, characteristics of the car, e.g., make model, license plate number, color of the car, and characteristics of the driver may be provided to camera system 100. Camera system 100 utilizes these characteristics when performing monitoring functions as described above to identify the vehicle as it arrives. After the user enters the vehicle, these characteristics are deleted to protect the privacy of the driver.

Neural network classifier 425, as shown, receives the outputs from characteristic extractor nodes 417a and 417b and, based on indications of particular characteristics being included or excluded from the identifiable object in image 133, generates output 435 which indicates a particular classification of the identifiable object. In some embodiments, the classification may simply indicate whether or not the object is of interest to the user, in which case secondary processing circuit 115 may use output 435 to determine whether to assert a wake signal to primary camera device 101, including primary processing circuit 105 and primary camera sensor 107. In other embodiments, the classification may include identifying a type of object, such as a person, an animal, a sign, a vehicle, and the like. In such embodiments, secondary processing circuit may include additional circuits, including for example, additional neural network classifiers, to determine if the identified type of object is an object of interest.

After primary camera device 101 wakes in response to an asserted wake signal, primary camera sensor 107 captures image 135 and stores it in memory circuit 450. Primary processing circuit 105 may then analyze image 135 to determine if a particular object of interest identified by secondary processing circuit 115 is valid. To determine whether the particular object is an object of interest, primary processing circuit 105 includes neural network 405 that is configured to identify one or more characteristics of the particular object based on set of characteristics 465. As described above, set of characteristics 465 may be larger than set of characteristics 460, due to including additional characteristics which may be used by neural network 405 to make a more accurate determination of objects of interest. Using characteristic extractor nodes 412a-412d, neural network classifier 420 may receive more inputs than neural network classifier 425 for generating outputs 430a and 430b that provide indications of a type of object identified in image 135 and whether the identified object is of interest to the user. Due to the increased level of detail and number of inputs in comparison to neural network classifier 425, neural network classifier 420 may take more time to generate outputs 430a and 430b and/or may also consume more power doing so.

Primary processing circuit 105 may utilize outputs 430a and 430b to provide a more accurate validation of an object of interest identified by secondary processing circuit 115. If primary processing circuit 105 validates the object of interest identified by secondary processing circuit 115, then camera system 100 generates a notification for the user. In some embodiments, primary processing circuit 105 generates the notification, in other embodiments, a different circuit (not shown in FIG. 4) in camera system 100 generates the notification.

In some embodiments, secondary processing circuit 115 may be further configured to update set of characteristics 460 based on the outputs 430a and 430b, and/or on whether primary processing circuit 105 validates the object of interest. For example, if primary processing circuit 105 validates an object of interest identified by secondary processing circuit 115, then one or more characteristics in set of characteristics 460 may be updated to reinforce similar decisions. In contrast, if the object of interest is invalidated by primary processing circuit 105, then one or more characteristics in set of characteristics 460 may be updated to reduce chances of a similar object being identified as interesting. In some embodiments, set of characteristics 460 may only be updated in response to an invalidation of an object of interest identified by secondary processing circuit 115.

Primary processing circuit 105 and/or secondary processing circuit 115 may be configured to further update, respectively, set of characteristics 465 and/or 460 based on feedback from the user. User feedback may include, for example, a direct confirmation by the user (e.g., a tap on a touchscreen, click of a mouse, gestures of the user's hands, movement of the user's head, etc.) whether an identified object is actually interesting. User feedback may also, or alternatively, include indications of a user's actions after being notified of the object of interest. For example, if the user faces, approaches, and/or interacts with the identified object of interest, then primary processing circuit 105 and/or secondary processing circuit 115 may interpret the interaction as a confirmation of the validation of the object of interest. If the object of interest is identified as a safety threat to the user, then indications of the user moving away from or otherwise avoiding the object may be interpreted as confirmation of the validation of the object of interest. On the other hand, if the user avoids or ignores a non-threatening object of interest, or approaches or interacts with an identified threat, then primary processing circuit 105 and/or secondary processing circuit 115 may interpret the action as a rejection of the validation of the object of interest.

By using neural networks to perform analysis of captured images, camera system 100 may be capable of detecting a variety objects in captured images. Through repeated use, neural networks may learn the interests of a particular user, and be capable of increasing a number of objects the camera system is able to detect, and increasing accuracy when determining which detected objects are of interest to the particular user.

It is noted that FIG. 4 is merely one example of the disclosed concepts. Although single-stage neural networks are shown for clarity, in other embodiments, neural networks 405 and 415 may include any suitable number of stages and, accordingly, any suitable number of input nodes and outputs.

Primary and secondary camera devices 101 and 110 that are included in camera system 100 may be utilized in a variety of combinations, depending on a current state of camera system 100. One example of various power states, and conditions for moving between the states is illustrated in FIG. 5.

Figure 5:
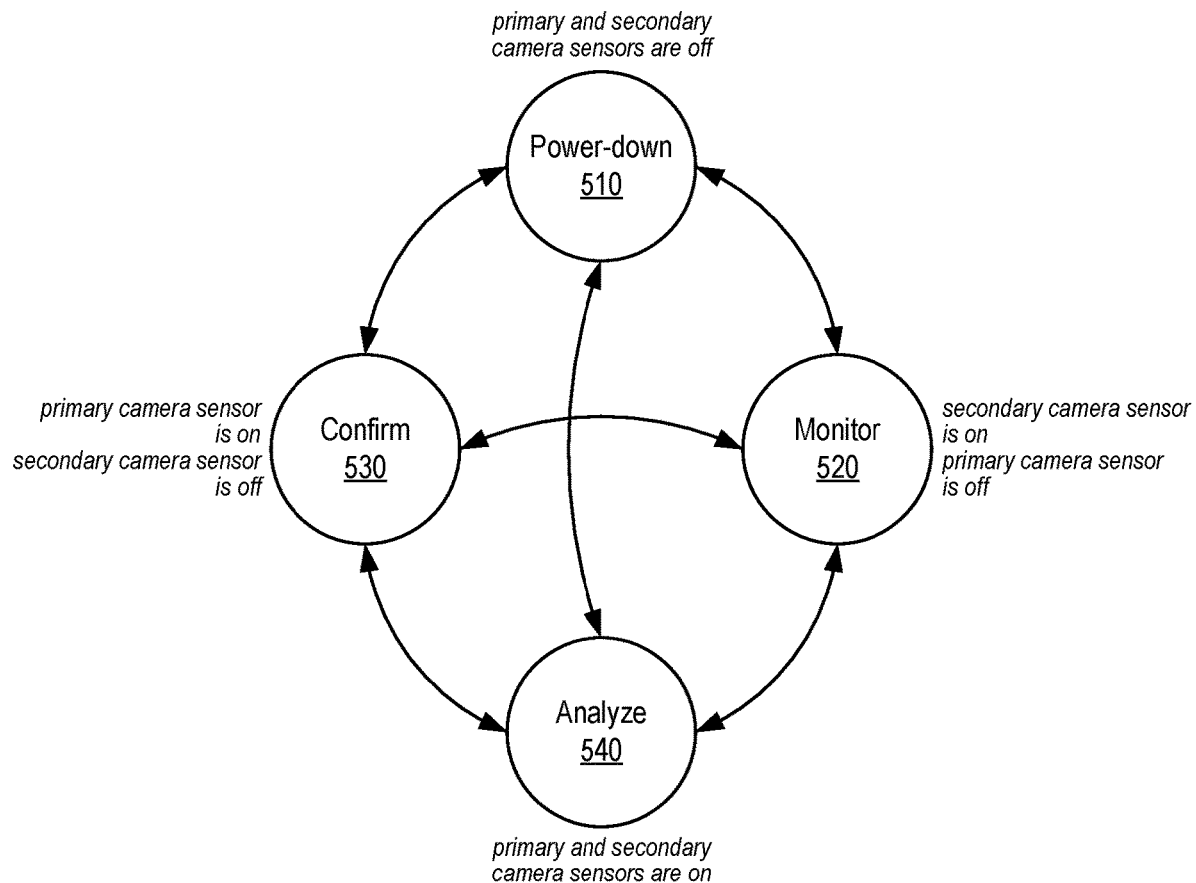
FIG. 5 shows an example of a state diagram for power modes for an embodiment of a camera system.

Turning to FIG. 5, a state diagram depicting four power states of an embodiment of a camera system is illustrated. State diagram 500 includes power-down state 510, monitor state 520, confirm state 530, and analyze state 540. The four states represent four combinations of power state for two camera devices included in a camera system, such as camera system 100 of FIGS. 1, 2, and 4.

As shown, when a computing device that includes camera system 100 is initialized or otherwise reset, camera system 100 resets to power-down state 510. In power-down state 510, both primary camera device 101 and secondary camera device 110 are in an "off" mode. The off-mode may be implemented using any suitable reduced power mode. For example, off may correspond to one or more power signals used by primary camera device 101 and secondary camera device 110 being gated such that the respective camera device does not receive power. In other embodiments, off may correspond to circuitry in the respective camera devices continuing to receive power, but being placed into a mode in which little to no processing occurs. For example, in an off-mode, primary processing circuit 105 may enter a wait state in which one or more clock signals are disabled and the circuits remain in a static state. Primary camera sensor 107 may be placed into a similar static state or be power-gated. The off state for secondary camera device 110 may or may not be similar to the off state of primary camera device 101. For example, primary camera device 101 may be placed into a power-gated state when off while secondary camera device 110 is placed into a static clock-gated state with power remaining coupled, thus allowing secondary camera device 110 to exit the off state more quickly than primary camera device 101.

In response to a signal to activate, camera system 100, as illustrated, exits power-down state 510 and enters monitor state 520. This activation signal may be generated by the computing device automatically after completion of a device reset sequence, or may be generated in response to launching of a particular application, or in response to input from a user. In monitor state 520, primary camera device 101 remains in the off-mode while secondary camera device 110 is in an active "on" mode. This on-mode includes secondary camera device 110 performing the monitoring tasks as described above, including capturing images and determining if the images include an object of interest 137.

After determining that an object of interest 137 is included in a particular captured image 133, camera system 100 may enter either of confirm state 530 or analyze state 540, depending on, for example, initial characteristics of object of interest 137 that are detected by secondary camera device 110. In some embodiments, secondary camera device 110 may make an initial identification of object of interest 137 to determine a priority value for performing an additional analysis of object of interest by primary camera device 101. For example, secondary camera device 110 may make an initial determination that object of interest 137 is a sign for a business at a destination in a navigation app running on the computing device, or on an associated device that is communicatively coupled to the computing device. Secondary camera device 110 may be further capable of determining a rate at which the user is approaching the sign. If the user is approaching rapidly (e.g., the user is in a car or other vehicle), then the priority value is set higher than if the user is approaching slowly (e.g., walking). Based on this determined priority value, either confirm state 530 or analyze state 540 is entered.

In some cases, camera system 100 may remain in monitor state 520 after detecting object of interest 137. Object of interest 137 may be an object that secondary camera device 110 is capable of confirming with a high level of accuracy. For example, object of interest 137 may be a bar code, QR code, or other form of easily recognizable symbol that does not require confirmation by primary camera device 101. In such cases, camera system 100 sends an appropriate notification to other circuits in the computing device, including for example, a visual, audible, and or haptic alert to the user. Camera system 100 may remain in monitor state 520 during and after such a notification.

In confirm state 530, primary camera device 101 is enabled and placed in the on-mode while secondary camera device 110 enters the off-mode to reduce power consumption. Confirm state 530 may be entered by camera system 100 after secondary camera device 110 detects object of interest 137, but determines that a priority value for confirming whether object of interest 137 is genuine is below a particular threshold. Returning to the business sign example, if secondary camera device determines that the rate at which the user is approaching the sign is slow, then confirm state 530 is entered. The slow rate of approach may allow enough time for primary camera device 101, acting without additional input from secondary camera device 110, to perform a confirmation whether the sign identified by secondary camera device 110 is actually for the desired destination. Accordingly, secondary camera device 110 may be placed into the off-mode to reduce power consumption while primary camera device 101 performs the confirmation.

In some embodiments, a priority value set by secondary camera device 110 may be used to determine one of a plurality of on-modes that primary camera device enters in confirm state 530. For example, if the user is riding a bicycle, the rate of approach may be slow enough for primary camera device 101 to perform the confirmation alone, but only if primary camera device 101 is placed into a high-performance on-mode. In contrast, if the user is walking, primary camera device 101 may have enough time to perform the confirmation while operating in a reduced-power on-mode. It is contemplated that primary camera device 101, and in some embodiments, secondary camera device 110, may support multiple levels of on-mode depending on a current image processing task being performed.

Analyze state 540, as shown, includes both primary camera device 101 and secondary camera device 110 in an on-mode. Analyze state 540 may provide an increased amount of image processing bandwidth as compared to the other three states. Accordingly, in the business sign example, if secondary camera device 110 determines a high priority value due to the user rapidly approaching the sign, then analyze state 540 may be entered such that the primary and secondary camera devices may be utilized in parallel to perform a confirmation that the detected sign is actually a sign associated with the desired destination. As before, a generated priority value may be used in embodiments in which secondary camera device 110 and/or primary camera device 101 have more than one on-mode, to determine which of the multiple on-modes are entered by each camera device.

It is noted that FIG. 5 is an example of a state diagram used to demonstrate the disclosed concepts. Although four states are shown, any suitable number of states may be included. For example, in embodiments in which more than one on-mode is available for either camera device, a different state may be associated with each combination of the multiple on-modes. In a similar fashion, either or both camera devices may support more than one off-mode, such as a power-and-clock-gated off-mode as well as a clock-gated only off-mode. Additional states may be assigned based on combinations of off-modes as well as on-modes.

The circuits and techniques described above in regards to FIGS. 1-5 may perform image processing using a variety of methods. Two methods associated with image processing are described below in regards to FIGS. 6 and 7.

Figure 6:
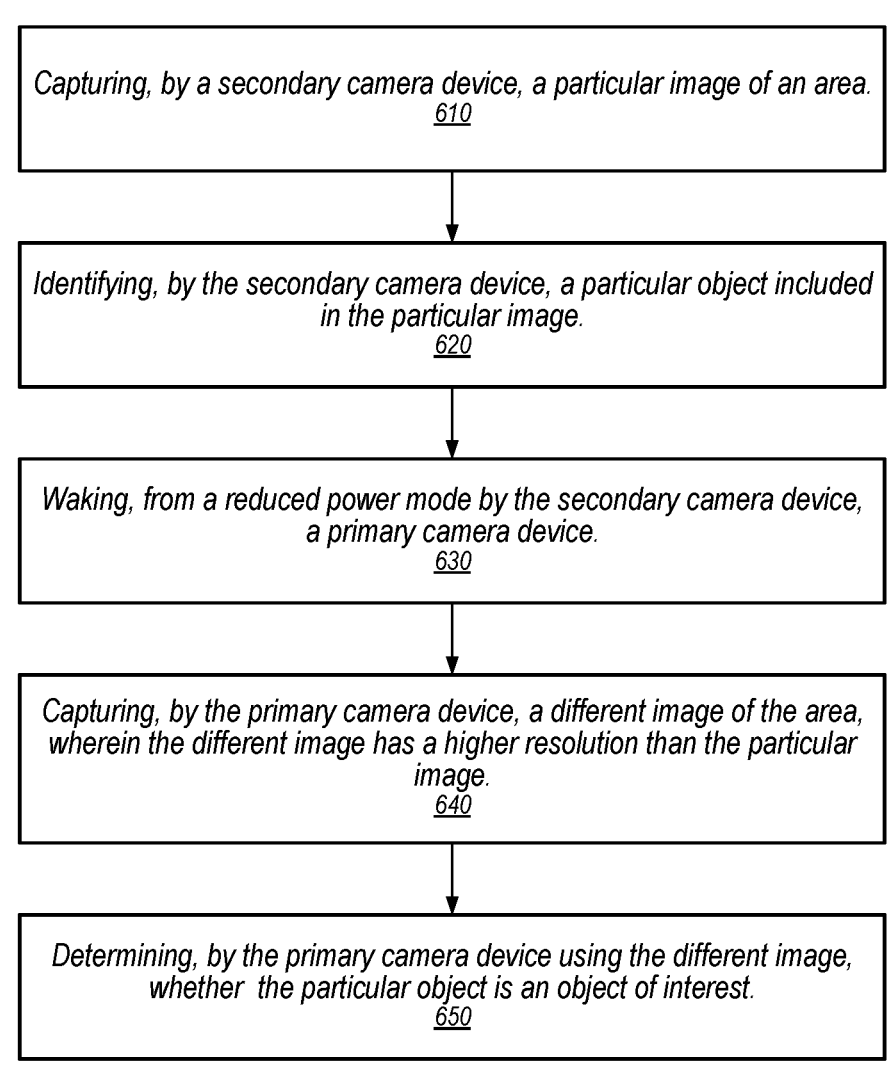
FIG. 6 shows a flow diagram of an embodiment of a method for identifying objects of interest within an area.

Moving now to FIG. 6, a flow diagram for an embodiment of a method for detecting objects of interest in images is shown. Method 600 may be performed by a camera system such as camera system 100 in FIGS. 1, 2 and 4. In some embodiments, for example, camera system 100 may include, or have access to, computer-readable non-transitory memory that includes instructions that, when executed by primary and secondary processing circuits 105 and 115, cause the operations of method 600 to be performed. Referring collectively to FIGS. 1 and 6, method 600 begins in block 610.

At block 610, method 600 includes capturing, by secondary camera device 110, image 133 of an area (e.g., field of view 131). Camera system 100 may be included in, or coupled to, a computing device of a user. The user, as illustrated, utilizes camera system 100 to monitor surroundings. As part of this monitoring, camera system 100 identifies and alerts the user to any objects detected in field of view 131 that may be of interest to the user.

Method 600, at block 620, includes identifying, by secondary camera device 110, a particular image included in image 133. Secondary camera device 110, using secondary processing circuit 115 as shown, identifies objects in image 133 and then determines if any identified objects may be an object of interest to the user. To identify a particular object as object of interest 137, secondary processing circuit 115 may include one or more neural networks configured to identify one or more characteristics of the particular object based on a first set of characteristics corresponding to known objects of interest to the user.

Method 600 also includes, at block 630, waking, from a reduced power mode by secondary camera device 110, primary camera device 101. In response to identifying object of interest 137, secondary processing circuit 115 asserts wake signal 141. As illustrated, primary camera device 101 receives wake signal 141, causing primary processing circuit 105 and primary camera sensor 107 to exit the reduced power mode. After exiting the reduced power mode, primary camera device 101 is used to validate object of interest 137 as a genuine object of interest for the user.

At block 640, method 600 further includes, capturing, by primary camera device 101, image 135 of the area, wherein image 135 has a higher resolution than image 133. As shown, primary camera sensor 107 is capable of capturing higher resolution images than the resolution of images captured by secondary camera sensor 117. In some embodiments, primary and secondary camera sensors 107 and 117 may be implemented using different designs, with secondary camera sensor 117 utilizing less power than primary camera sensor 107, but being incapable of producing images with as much resolution as primary camera sensor 107. In other embodiments, primary and secondary camera sensors 107 and 117 may be implemented using similar designs, but with secondary camera sensor 117 configured to use less power than primary camera sensor 107.

Method 600, at block 650, also includes determining, by primary camera device 101 using image 135, whether the particular object is an object of interest. As illustrated, primary camera device 101, using primary processing circuit 105, identifies, in image 135, the particular object identified by secondary processing circuit 115 as object of interest 137. Primary processing circuit 105 then validates if object of interest 137 is an object that may actually be of interest to the user. To validate object of interest 137, primary processing circuit 105 may include one or more neural networks configured to identify one or more characteristics of object of interest 137 based on a second set of characteristics corresponding to known objects of interest to the user. This second set of characteristics may include more characteristics and/or more details of the characteristics than the first set of characteristics used by secondary processing circuit 115.

In some embodiments, method 600 may end in block 650, or in other embodiments, may repeat in response to a new captured image by the secondary camera sensor. It is noted that the method of FIG. 6 is merely an example for identifying objects of interest by a camera system. As disclosed above, method 600 may be performed by respective elements in FIGS. 1, 2, and 4. Variations of the disclosed methods are contemplated. For example, operations of blocks 610 and 620 may be performed for a second image while operations for blocks 640 and 650 are performed for a first image.

Figure 7:
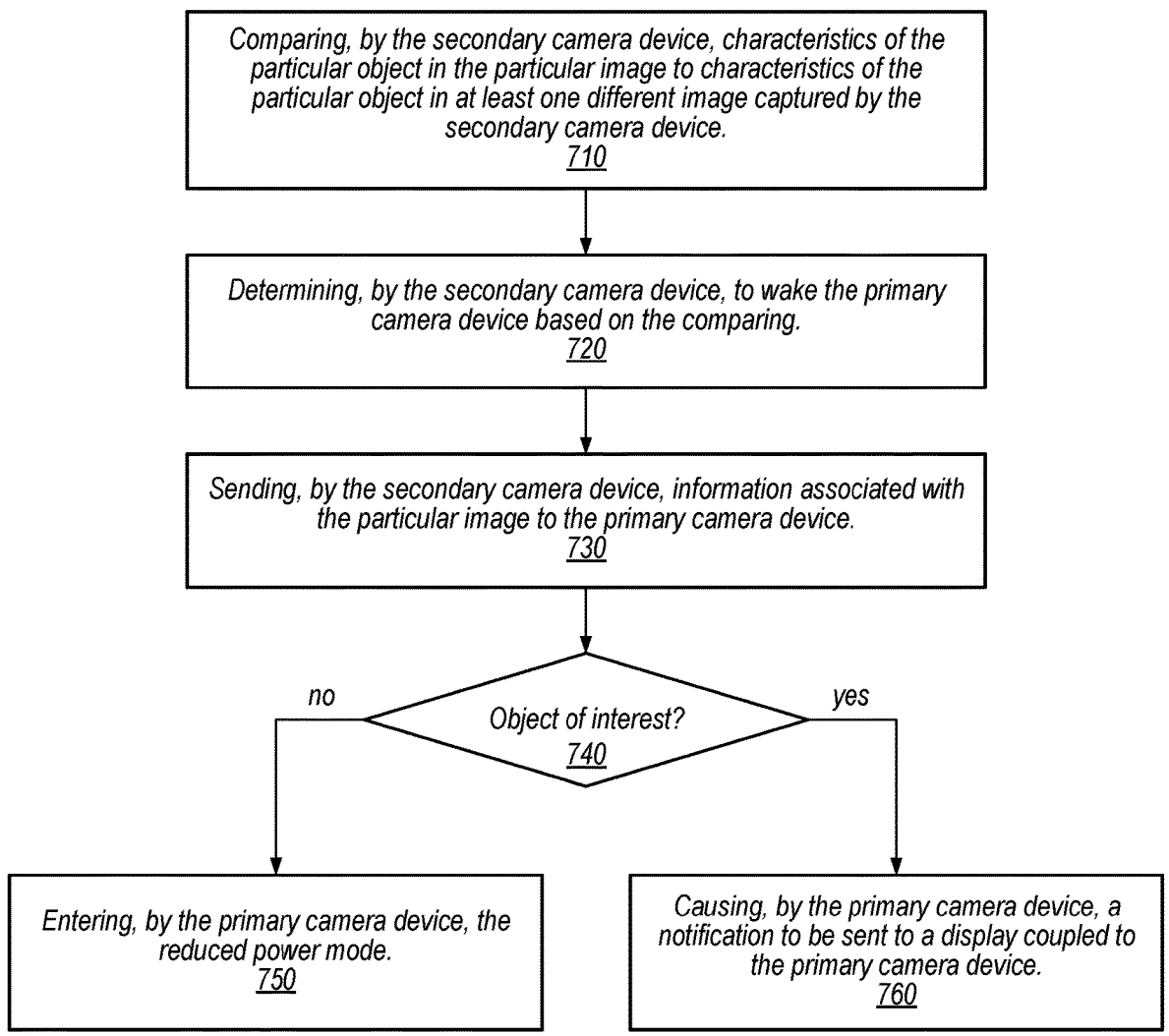
FIG. 7 shows a flow diagram of an embodiment of a method for validating whether a particular object in a first image is an object of interest.

Turning now to FIG. 7, a flow diagram for another embodiment of a method for identifying objects of interest by a camera system is illustrated. In a similar manner as for method 600 above, method 700 may be performed by a camera system such as camera system 100 in FIGS. 1, 2 and 4. Camera system 100 may, in some embodiments, include or have access to computer-readable non-transitory memory that includes instructions that, when executed by primary and secondary processing circuits 105 and 115, cause the operations of method 700 to be performed. Referring collectively to FIGS. 1 and 7, method 700 begins in block 710 after secondary camera device 110 has captured an image for analysis.

At block 710, method 700 includes comparing, by secondary camera device 110, characteristics of a particular object in image 133 to characteristics of the particular object in at least one different image captured by secondary camera device 110. In some cases, secondary camera device 110 may analyze two or more consecutive images to make a determination that the particular object is an object of interest 137. For example, referring to FIG. 3, image 133 may correspond to image 333*b*. Secondary camera device 110 may first capture and analyze image 333*a*, and determine that there is not an object of interest in image 333*a*. When analyzing subsequently captured image 333*b*, secondary camera device 110 makes comparisons between image 333*b* and 333*a*, determining that the person in bounding boxes 350*a* and 350*b* is approaching the user.

Method 700, at block 720, includes determining to wake primary camera device 101 based on the comparing. For example, in response to determining that the person identified in bounding boxes 350*a* and 350*b* is approaching the user, secondary camera device 110 identifies the person as object of interest 137. In response to determining that the person in bounding box 350*b* is an object of interest 137 in image 333*b*, secondary camera device 110 asserts wake signal 141, causing primary camera device 101 to exit a reduced power mode. In some embodiments, secondary processing circuit 115 may include one or more neural networks, such as neural network 415 of FIG. 4, to identify object of interest 137 based on a first set of characteristics corresponding to known objects of interest to the user.

Method 700 also includes, at block 730, sending, by secondary camera device 110, information associated with image 333*b* to primary camera device 101. In response to determining that primary camera device 101 has exited the reduced power mode, secondary camera device 110, as shown, sends information regarding image 333*b* to primary camera device 101. For example, secondary camera device 110 may send coordinates corresponding to bounding box 350*b*, a priority associated with object of interest 137, indications of characteristics that were used to make the determination, and/or other similar information.

Further operations of method 700 depend, at block 740, on a validation of object of interest 137. Primary camera device 101, as illustrated, may use the information received from secondary camera device 110 to validate whether object of interest 137 that was identified by secondary camera device 110 is likely to be of genuine interest to the user. To validate object of interest 137, primary processing circuit 105 may include one or more neural networks (e.g., neural network 405 of FIG. 4) configured to identify one or more characteristics of object of interest 137 based on a second set of characteristics corresponding to known objects of interest to the user. This second set of characteristics may include more characteristics and/or more details of the characteristics than the first set of characteristics used by secondary processing circuit 115. If primary camera device 101 validates object of interest 137, then method 700 moves to block 760 to notify the user. In some embodiments, validation of object of interest 137 includes an augmented and/or enhanced portrayal of object of interest 137. Otherwise, method 700 moves to block 750.

At block 750, method 700 further includes, in response to determining that the particular object is not an object of interest, entering, by primary camera device 101, the reduced power mode. If object of interest 137 is not validated as being of interest to the user, then no notification is sent to the user and primary camera device 101 re-enters the reduced power mode to conserve power, allowing secondary camera device 110 to further monitor an area within field of view 131. Method 700 may end and camera system 100 may perform a different method, such as method 600.

Method 700, at block 760, includes, in response to determining that the particular object is an object of interest 137, causing, by primary camera device 101, a notification to be sent to a display coupled to primary camera device 101. If object of interest 137 is validated by primary camera device 101, then a notification is sent to the user. The notification may include any one or more of a visual alert on a display screen such as a smartphone or smartwatch screen or a display integrated into a pair of glasses, an audible alert generated by a computing device including or coupled to camera system 100, a physical vibration or particular pattern of vibrations by the computing device, other forms of haptic feedback, and the like. Method 700 may end and camera system 100 may perform a different method, such as method 600.

In some embodiments, method 700 may further include analyzing, by camera system 100, a reaction by the user to determine how the user responds to the notification. The user's reactions may be indicative of whether the user is actually interested in the identified object of interest. In such embodiments, including, for example, embodiments that utilize neural networks, the user's interest may be used to train the secondary camera device, thereby increasing an accuracy for successfully identifying a genuine object of interest for the user. By increasing the accuracy of the secondary camera device, false positive identifications by the secondary camera device may be reduced, and the higher-power primary camera device may be left in a reduced power mode for longer periods of time, thereby reducing overall power consumption of the camera system.

It is noted that the method of FIG. 7 is merely an example for identifying objects of interest in view of a camera system. As disclosed above, method 700 may be performed by respective elements in FIGS. 1, 2, and 4. Variations of the disclosed methods are contemplated, including combinations of operations of methods 600 and 700. For example, block 710 of method 700 may be performed as a part of block 620 in method 600, and blocks 740 to 760 may be performed at the end of method 600.

Figure 8:
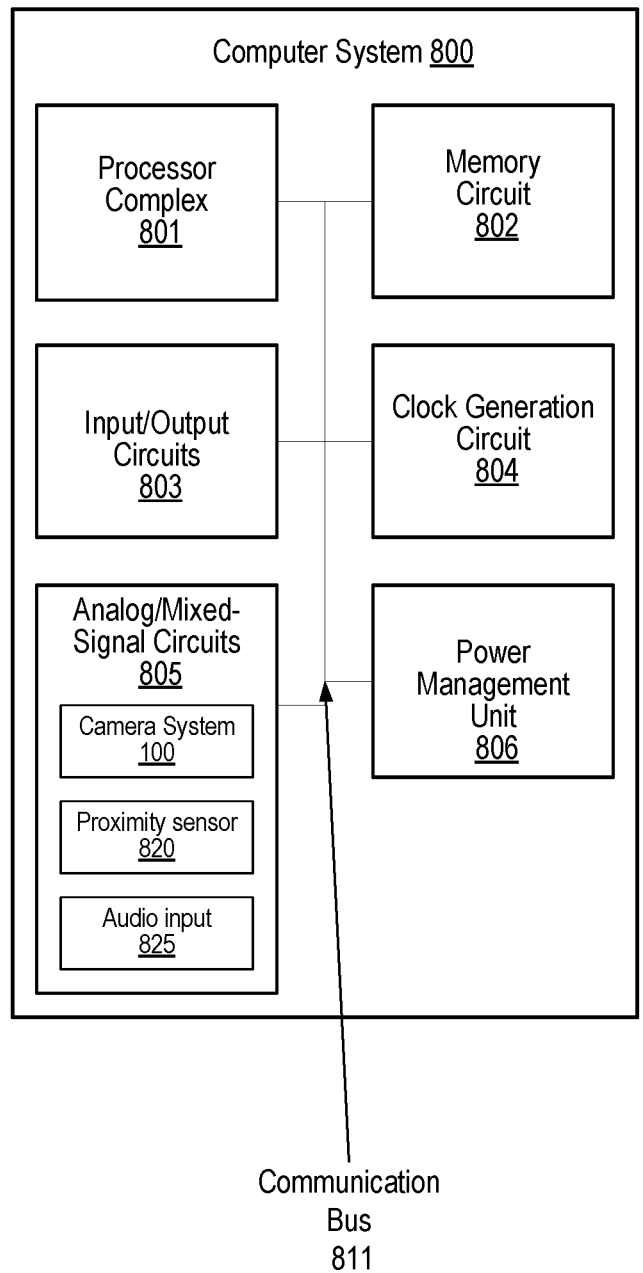
FIG. 8 depicts a block diagram of an embodiment of a computer system associated with the camera system of FIG. 1.

FIGS. 1-7 illustrate apparatus and methods for a camera system that supports the disclosed image analyzing techniques. Any disclosed embodiment of camera system 100 may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 800 is illustrated in FIG. 8. Computer system 800 may, in some embodiments, include any disclosed embodiment of camera system 100.

As shown, computer system 800 includes processor complex 801, memory circuit 802, input/output circuits 803, clock generation circuit 804, analog/mixed-signal circuits 805, and power management unit 806. These functional circuits are coupled to each other by communication bus 811. As shown, analog/mixed-signal circuits 805 includes an embodiment of camera system 100, as well as proximity sensor 820 and audio input 825. In some embodiments, input/output circuits 803 may include some or all of camera system 100. Computer system 800 may, in various embodiments, be implemented as a single integrated circuit (IC), as a plurality of ICs coupled together via one or more circuit boards, as a variety of devices coupled by cables or wireless connections, or suitable combinations thereof.

Processor complex 801, in various embodiments, may be representative of a general-purpose processor that performs computational operations. For example, processor complex 801 may be a central processing unit (CPU) such as a microprocessor, a microcontroller, an application-specific integrated circuit (ASIC), or a field-programmable gate array (FPGA). In some embodiments, processor complex 801 may correspond to a special purpose processing core, such as a graphics processor, audio processor, or neural processor, while in other embodiments, processor complex 801 may correspond to a general-purpose processor configured and/or programmed to perform one such function. Processor complex 801, in some embodiments, may include a plurality of general and/or special purpose processor cores as well as supporting circuits for managing, e.g., power signals, clock signals, and memory requests. In addition, processor complex 801 may include one or more levels of cache memory to fulfill memory requests issued by included processor cores.

Memory circuit 802, in the illustrated embodiment, includes one or more memory circuits for storing instructions and data to be utilized within computer system 800 by processor complex 801. In various embodiments, memory circuit 802 may include any suitable type of memory such as a dynamic random-access memory (DRAM), a static random access memory (SRAM), a read-only memory (ROM), electrically erasable programmable read-only memory (EEPROM), or a non-volatile memory, for example. It is noted that in the embodiment of computer system 800, a single memory circuit is depicted. In other embodiments, any suitable number of memory circuits may be employed. In some embodiments, memory circuit 802 may include a memory controller circuit as well communication circuits for accessing memory circuits external to computer system 800.

Input/output circuits 803 may be configured to coordinate data transfer between computer system 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 803 may be configured to implement a version of Universal Serial Bus (USB) protocol or IEEE 1394 (Firewire®) protocol.

Input/output circuits 803 may also be configured to coordinate data transfer between computer system 800 and one or more devices (e.g., other computing systems or integrated circuits) coupled to computer system 800 via a network. In one embodiment, input/output circuits 803 may be configured to perform the data processing necessary to implement an Ethernet (IEEE 802.3) networking standard such as Gigabit Ethernet or 10-Gigabit Ethernet, for example, although it is contemplated that any suitable networking standard may be implemented.

Clock generation circuit 804 may be configured to enable, configure and manage outputs of one or more clock sources. In various embodiments, the clock sources may be located in analog/mixed-signal circuits 805, within clock generation circuit 804, in other blocks with computer system 800, or come from a source external to computer system 800, coupled through one or more I/O pins. In some embodiments, clock generation circuit 804 may be capable of enabling and disabling (e.g., gating) a selected clock source before it is distributed throughout computer system 800. Clock generation circuit 804 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Analog/mixed-signal circuits 805 may include a variety of circuits including, for example, a crystal oscillator, PLL or FLL, and a digital-to-analog converter (DAC) (all not shown) configured to generated signals used by computer system 800. In some embodiments, analog/mixed-signal circuits 805 may also include radio frequency (RF) circuits that may be configured for operation with cellular telephone networks. Analog/mixed-signal circuits 805 may include one or more circuits capable of generating a reference voltage at a particular voltage level, such as a voltage regulator or band-gap voltage reference.

As illustrated, analog/mixed-signal circuits 805 includes an instance of camera system 100, in addition to proximity sensor 820 and audio input 825. Proximity sensor 820 includes circuits capable of detecting a presence of a person, animal, or other object that is within a particular range of the proximity sensor. Detection of such objects may be based on a generation, and subsequent detection, of an electro-magnetic field. For example, proximity sensor 820 may be coupled to a transmit antenna or other type of transmit node that is capable of transmitting the electro-magnetic field. Proximity sensor 820 may further be coupled to a receiving antenna/node that is sensitive to changes in an electro-magnetic field. The electro-magnetic field is transmitted with a particular set of characteristics. Proximity sensor 820 detects changes in the received electromagnetic field that may be indicative to an object other than air being in the vicinity of the receiving antenna. Such a system may be used to determine if computer system is being held, worn, or otherwise in use by a user. In response to a recognizable change in the electro-magnetic field, proximity sensor 820 may assert an alert signal or send a notification to other portions of computer system 800.

Audio input 825, as shown, includes an amplifier circuit capable of detecting signal frequencies that are within an audible range, such as an output signal from a microphone. Audio input 825 may further include or be coupled to audio processing circuits capable of digitizing and analyzing received audio signals, for example, to detect a user's voice and, in some embodiments, to recognize one or more voice commands. In addition, audio input 825 may be capable of generating an alert signal or send a notification to other portions of computer system 800.

Power management unit 806 may be configured to generate a regulated voltage level on a power supply signal for processor complex 801, input/output circuits 803, memory circuit 802, and other circuits in computer system 800. In various embodiments, power management unit 806 may include one or more voltage regulator circuits, such as, e.g., a buck regulator circuit, configured to generate the regulated voltage level based on an external power supply (not shown). In some embodiments any suitable number of regulated voltage levels may be generated. Additionally, power management unit 806 may include various circuits for managing distribution of one or more power signals to the various circuits in computer system 800, including maintaining and adjusting voltage levels of these power signals. Power management unit 806 may include circuits for monitoring power usage by computer system 800, including determining or estimating power usage by particular circuits.

It is noted that the embodiment illustrated in FIG. 8 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 9:
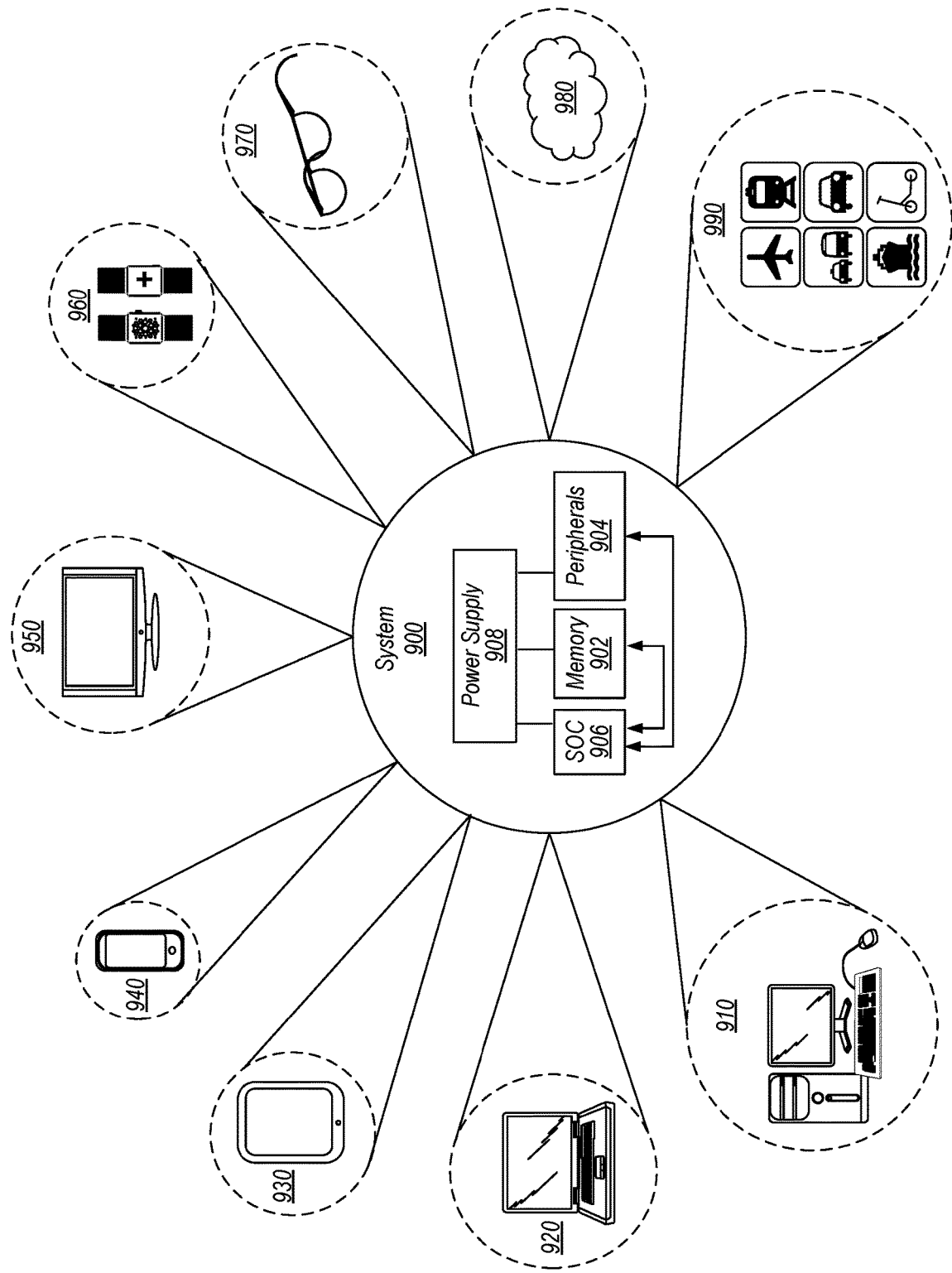
FIG. 9 illustrates various embodiments of systems that include camera systems.

Turning next to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing circuits, such as a central processing unit (CPU), a graphics processing unit (GPU), or otherwise, a communication fabric, and interfaces to memories and input/output devices. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration. In some embodiments, memory 902 may correspond to (or include) memory circuit 450 in FIG. 4.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc. In some embodiments, peripherals 904 may include one or more implementations of camera system 100.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices 970 are contemplated as well, such as devices worn around the neck, devices attached to hats or other headgear, devices that are implantable in the human body, eyeglasses designed to provide an augmented and/or virtual reality experience, and so on.

System 900 may further be used as part of a cloud-based service(s) 980. For example, the previously mentioned devices, and/or other devices, may access computing resources in the cloud (i.e., remotely located hardware and/or software resources). Also illustrated in FIG. 9 is the application of system 900 to various modes of transportation 990. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

As disclosed in regards to FIG. 9, camera system 100 may be one or more integrated circuits within a personal computer, smart phone, tablet computer, or other type of computing device. A process for designing and producing an integrated circuit using design information is presented below in FIG. 10.

Figure 10:
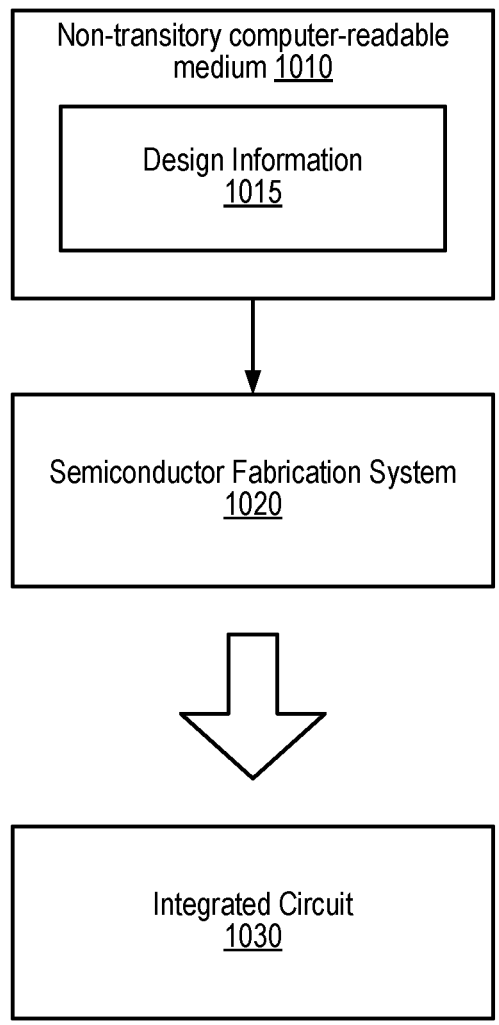
FIG. 10 shows a block diagram of an example computer-readable medium, according to some embodiments.

FIG. 10 is a block diagram illustrating an example of a non-transitory computer-readable storage medium that stores circuit design information, according to some embodiments. The embodiment of FIG. 10 may be utilized in a process to design and manufacture integrated circuits, such as, for example, an IC that includes computer system 800 of FIG. 8 or system 900 of FIG. 9. In the illustrated embodiment, semiconductor fabrication system 1020 is configured to process the design information 1015 stored on non-transitory computer-readable storage medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

As described above, one aspect of the present technology is the gathering and use of data available from specific and legitimate sources, including cameras, to identify people, places, and/or objects that may be of interest to users. The present disclosure contemplates that in some instances, this gathered data may include personal information data that uniquely identifies or can be used to identify a specific person. Such personal information data can include images, demographic data, location-based data, online identifiers, or any other personal information.

The present disclosure recognizes that the use of such personal information data, in the present technology, can be used to the benefit of users. For example, the personal information data can be used to identify people of interest to the user in accordance with their preferences. Further, other uses for personal information data that benefit the user are also contemplated by the present disclosure. For instance, location and calendar data may be used, in accordance with the user's preferences, to identify particular people, places, transportation, and the like that may be relevant to the user's current location and the time of day.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the United States, collection of or access to various forms of electronically-stored personal data is governed by a variety of state and federal laws for example, the California Consumer Privacy Act (CCPA); whereas personal data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of using calendar data of a user to aid in the identification of a particular business, the present technology can be configured to allow users to select to "opt in" or "opt out" of participation in the collection of personal information data during registration for monitoring services or anytime thereafter. In another example, users can establish a length of time that calendar data is blocked or entirely block the use of calendar data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app. In other embodiments, the user may be directed to a privacy policy site upon downloading an app, the privacy policy site providing details and options for how a user's data may be obtained and utilized.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's, or other entity's, privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, objects of interest can be identified and highlighted to users based on aggregated non-personal information data or a bare minimum amount of personal information, such as the content being handled only on the user's device or other non-personal information available to the system.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus comprising:
a primary device, including a primary sensor, configured to detect datasets of interest within data collected from the primary sensor; and
a secondary device, including a secondary sensor, configured to:
while the primary device is in a reduced-power state, detect a particular dataset of interest in data collected from the secondary sensor;
determine, using the data collected from the secondary sensor, a priority value for the particular dataset of interest, wherein the priority value is indicative of a time period to determine whether the particular dataset of interest is valid;
determine, using the priority value, to cause the primary device to exit the reduced-power state; and
after the exiting, process additional data collected from the secondary sensor; and
wherein the primary device is further configured to:
in response to the exiting, process new data collected from the primary sensor; and
determine, based on the processing of the new data by the primary device and the additional data by the secondary device, whether the particular dataset of interest is valid.

2. The apparatus of claim 1, wherein the secondary device is further configured to: prior to determining the priority value, determine whether the particular dataset of interest can be validated without waking the primary device from the reduced-power state; and
in response to a determination that the particular dataset of interest cannot be validated, cause the primary device to exit the reduced-power state.

3. The apparatus of claim 2, wherein the secondary device is further configured to: in response to a determination that the particular dataset of interest can be validated without waking the primary device, confirm that the particular dataset of interest is valid without waking the primary device.

4. The apparatus of claim 1, wherein the secondary device is further configured to:
detect a different dataset of interest in the data collected from the secondary sensor;
determine, using a different priority value for the different dataset, to cause the primary device to re-exit the reduced-power state; and
in response to the primary device re-exiting the reduced-power state, enter the reduced-power state; and
wherein the primary device is further configured to:
in response to the re-exiting, process newer data collected from the primary sensor; and
determine, based on the processing of the newer data from the primary sensor, whether the different dataset of interest is valid.

5. The apparatus of claim 1, wherein a resolution of the primary device is greater than a resolution of the secondary device; and
wherein a power consumption of the primary device is greater than a power consumption of the secondary device.

6. The apparatus of claim 1, wherein the primary device is further configured to:
in response to an indication to enter a power-down mode, enter the reduced-power state, wherein the primary device has a first wake-up time from the reduced-power state to an active state; and
wherein the secondary device is further configured to:
in response to the indication to enter the power-down mode, enter the reduced-power state, wherein the secondary device has a second wake-up time that is less than the first wake-up time.

7. The apparatus of claim 1, wherein to process data collected from the primary sensor, the primary device includes a primary neural network that uses a first set of characteristics; and
wherein to process data collected from the secondary sensor, the secondary device includes a secondary neural network that uses a second set of characteristics.

8. The apparatus of claim 7, wherein the second set of characteristics is a proper subset of the first set of characteristics; and wherein to process collected data, the secondary neural network includes fewer nodes than the primary neural network.

9. A method, comprising:

causing, by a power-mode state machine, a primary device and a secondary device to enter a reduced-power state;

in response to a first indication to enter a monitor state, causing, by the power-mode state machine, the secondary device to enter an active state, wherein the secondary device processes data from a secondary sensor in the active state;

in response to a second indication from the secondary device to enter a confirm state to validate a particular dataset of interest, causing, by the power-mode state machine, the primary device to enter an active state to confirm the particular dataset of interest, wherein the primary device processes data from a primary sensor in the active state; and in response to a third indication to re-enter the monitor state, causing, by the power-mode state machine, the primary device to re-enter the reduced-power state.

10. The method of claim 9, further comprising:

based on the second indication from the secondary device, causing, by the power-mode state machine, the secondary device to re-enter the reduced-power state.

11. The method of claim 9, further comprising:

after entering the active state in response to the first indication, collecting, by the secondary device, data from the secondary sensor;

detecting, by the secondary device, the particular dataset of interest in the collected data; and in response to determining that the particular dataset of interest cannot be validated without the primary device, determining, by the secondary device, a priority value for the particular dataset of interest.

12. The method of claim 11, further comprising:

sending, by the secondary device based on the priority value, the second indication with a request to enter the confirm state.

13. The method of claim 11, wherein detecting the particular dataset of interest includes using, by the secondary device, a secondary neural network to process the collected data, wherein the processing includes:

identifying an object in the particular dataset of interest;
determining a type of the object; and
using the determined type of object to determine whether to send the second indication.

14. The method of claim 9, further comprising:

after entering the active state in response to the second indication, collecting, by the primary device, new data from the primary sensor;

using, by the primary device, a primary neural network to process the new data collected from the primary sensor; and based on one or more outputs of the primary neural network, determining whether the particular dataset of interest is valid.

15. A system, comprising:

a memory circuit;
a processor circuit configured to execute program instructions stored in the memory circuit;
a sensor system including:

a sensor circuit including a primary sensor and a secondary sensor;

a primary device, configured to detect datasets of interest within data collected from the primary sensor;

a secondary device configured to detect datasets of interest in data collected from the secondary sensor;

wherein the processor circuit is configured to:

in response to executing a particular application, send an indication to the sensor system to exit a reduced-power state and enter a monitor state;

wherein the sensor system is configured to:

in response to the indication, wake the secondary device from the reduced-power state while the primary device remains in the reduced-power state;

use the secondary device to identify a particular dataset of interest in data collected from the sensor circuit; and use the particular dataset of interest to determine whether to wake the primary device from the reduced-power state to determine whether the particular dataset of interest is valid.

16. The system of claim 15, wherein the secondary device includes a secondary neural network, and wherein the secondary device is configured to:

use the secondary neural network to generate one or more coarse outputs indicative of the particular dataset of interest; and use the one or more coarse outputs to determine if the particular dataset of interest can be validated without waking the primary device.

17. The system of claim 16, wherein the sensor system is further configured to:

in response to an indication from the secondary device, wake the primary device and use the primary device to validate the particular dataset of interest, wherein the primary device includes a primary neural network, and wherein the primary device is configured to use the primary neural network to generate one or more primary outputs indicative of a validity of the particular dataset of interest; and in response to a determination that the particular dataset of interest is valid, send a notification of the validity of the particular dataset of interest to the processor circuit.

18. The system of claim 17, wherein the processor circuit is further configured to send one or more characteristics provided by the particular application to the sensor system; and wherein the sensor system is further configured to add the one or more characteristics to a set of characteristics that are used by the primary, but not the secondary, neural network.

19. The system of claim 15, wherein the sensor system is further configured to based on the particular dataset of interest, wake the primary device from the reduced-power state while maintaining the secondary device in an active state.

20. The system of claim 19, wherein the sensor system is further configured to:

use the primary and secondary devices in parallel to collect and process additional data associated with the particular dataset of interest; and using outputs from both the primary and secondary devices, determine whether the particular dataset of interest is valid.

* * * * *